United States Patent

Taig

[11] Patent Number: 4,538,710
[45] Date of Patent: Sep. 3, 1985

[54] MECHANICAL BRAKE CONTROL DEVICE
[75] Inventor: Alistair G. Taig, South Bend, Ind.
[73] Assignee: Allied Corporation, Morristown, N.J.
[21] Appl. No.: 421,218
[22] Filed: Sep. 22, 1982
[51] Int. Cl.³ .............................................. B60K 41/24
[52] U.S. Cl. ................................. 192/13 A; 192/3 H
[58] Field of Search ................. 192/3 H, 13 A, 30 V, 192/44; 188/353; 303/98; 74/470, 477, 490; 403/397, 11

[56] References Cited

U.S. PATENT DOCUMENTS

| | | | |
|---|---|---|---|
| 1,909,859 | 5/1933 | Gunderman | 192/13 A |
| 2,036,700 | 4/1936 | Johnson | 192/13 A |
| 2,048,501 | 7/1936 | Goosman | 192/30 U |
| 2,131,944 | 10/1938 | Freeman | 192/13 |
| 2,160,126 | 5/1939 | Coffman | 192/13 |
| 2,167,501 | 7/1939 | Freeman | 192/13 |
| 2,228,244 | 1/1941 | Baker | 188/67 |
| 2,251,787 | 8/1941 | Gardiner | 192/13 A |
| 2,284,189 | 5/1942 | Dick | 192/3 H |
| 2,499,993 | 3/1950 | Gregg | 188/67 |
| 2,722,847 | 11/1955 | Petrochko | 74/478.5 |
| 3,659,329 | 5/1972 | Walker | 403/11 |
| 4,299,134 | 11/1981 | Roy et al. | 74/470 |

FOREIGN PATENT DOCUMENTS 1455631  5/1969  Fed. Rep. of Germany .

Primary Examiner—Rodney H. Bonck
Assistant Examiner—Richard M. Lorence
Attorney, Agent, or Firm—Larry J. Palguta; Ken C. Decker

[57] ABSTRACT

A vehicle with a brake pedal (10) and a clutch pedal (12) includes a mechanical control device (20) with a connecting member (26) coupled to the brake pedal (10) and a control member (36) coupled to the clutch pedal (12). A ball (50) cooperates with the connecting member (26) solely in response to vehicle angular elevation to tightly engage the connecting member (26) when the vehicle is facing an incline to retain the brake pedal in its applied position.

33 Claims, 6 Drawing Figures

MECHANICAL BRAKE CONTROL DEVICE

The present invention relates to a mechanical brake control device wherein a vehicle with a clutch pedal and a brake pedal can be held stationary on an incline without the vehicle operator retaining his foot on the brake pedal and while the clutch pedal is actuated to disengage a transmission.

A mechanical brake control device for a vehicle including a brake pedal and a clutch pedal wherein the brake pedal is movable to a brake applied mode during braking, the device comprising a housing adapted for attachment to the vehicle, a connecting member extending from the housing to the brake pedal for movement with the latter, locking means cooperating with the housing and the connecting member to selectively fix the connecting member and the brake pedal relative to the housing, and control means extending from the clutch pedal to the housing, the control means being operable in response to movement of the clutch pedal to render the locking means in an operative mode or an inoperative mode.

It is known that a valve can be disposed in a brake fluid line for a vehicle to generate a hill-holding effect so that the vehicle will remain stationary on an inclined surface upon termination of braking, thereby permitting a vehicle operator to use one foot to control a clutch pedal while the other foot is controlling an accelerator pedal. This type of hydraulic hill-holder requires alterations for the brake fluid lines and introduces addition potential leak points in the fluid lines. In view of the critical operation of vehicle brakes, these added leak possibilities are not widely accepted by vehicle manufactures.

It is also known that a mechanical brake control, such as illustrated in U.S. Pat. No. 1,909,859 can be provided which provides a mechanical lock for a brake pedal in response to operation of a vehicle clutch pedal with a positive connection being required between a locking roller and the clutch pedal. The clutch pedal moves the roller into an operative position and also withdraws the roller therefrom. Consequently, the locking roller is engageable with the brake pedal extension every time the clutch pedal is depressed. In addition, the brake control requires a large support for receiving a brake pedal extension and a separate bearing assembly is required to carry the locking roller within the large support.

The present invention is characterized in that said housing defining a guide upon which said locking means is disposed, said guide being normally disposed in a substantially horizontal plane when the vehicle is also disposed on a substantially horizontal surface, said locking means being movable into direct engagement with said connecting member solely in response to the vehicle and said guide being repositioned angularly relative to the horizontal plane, provided said control means maintains said locking means in an operative mode, whereby said locking means frictionally engages said connecting member to fix the latter and said brake pedal relative to said housing in a brake applied mode.

It is an advantage of the present invention that a compact control device is provided for disposition between the brake pedal and the clutch pedal. In addition, the control device herein is provided with a locking member or ball that is solely responsive to vehicle angular elevation to hold the vehicle on an inclined surface and prevent roll back.

The invention will now be described with reference to the accompanying drawings wherein.

Figure 1:
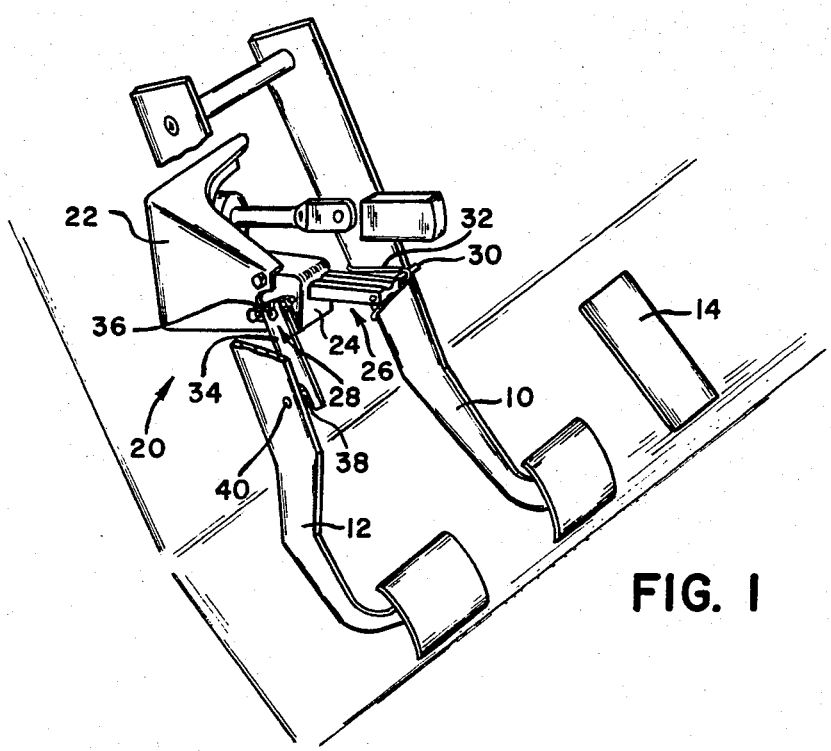
FIG. 1 is a perspective view of a vehicle brake pedal and clutch pedal with the control device in operation therewith.

A brake pedal 10 is disposed in a vehicle so that a vehicle operator can depress the brake pedal to brake the vehicle. A clutch pedal 12 is disposed in the vehicle adjacent the brake pedal 10 so that the operator can disengage a transmission (not shown) by depressing the clutch pedal thereby permitting the transmission to be shifted to different gears. The vehicle also includes an accelerator pedal 14 to control engine operation.

In accordance with the invention, a mechanical brake control device 20 is disposed substantially between the brake pedal 10 and the clutch pedal 12. A mounting bracket 22 is secured to the vehicle and a housing 24 is carried by the bracket adjacent the pedals 10 and 12. A connecting member 26 extends from the brake pedal 10 to the housing 24 and a control assembly 28 extends from the clutch pedal 12 to the housing 24. The connecting member 26 includes a pin 30 with a wire clip 32 biasing the pin 30 into abutment with the brake pedal 10. Such an arrangement permits the brake pedal 10 to overcome the wire clip 32 in the event the connecting member 26 fails to move with the brake pedal during braking. However, the brake pedal can not return to its rest position without also returning the connecting member 26 to its rest position. The control assembly 28 includes a link 34 coupled to a cam shaft 36 and the link is slotted at 38 to movably receive a pin 40 secured to the clutch pedal 12.

Figure 2:
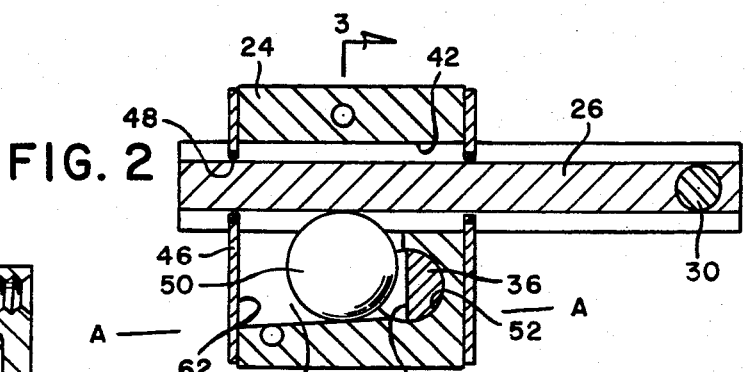
FIG. 2 is a cross-sectional view of the control device apart from the brake pedal and the clutch pedal.
Figure 3:
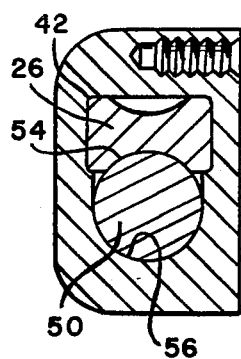
FIG. 3 is a cross-sectional view taken along line 3—3 of FIG. 2.

Turning to FIG. 2, the housing 24 defines a bore 42 movably receiving the connecting member 26. A cavity 44 opens to the bore 42 and a plate 46 is secured to the housing to close the cavity and define an opening 48 movably receiving the connecting member 26. A ball or locking member 50 is movably disposed within the cavity 44. The cam shaft 36 is rotatably disposed within a cross bore 52 leading to the cavity 44 at one end thereof opposite from the plate 46. As shown in FIG. 3, the connecting member 26 forms an arcuate concave surface 54 substantially identical to the contour of the peripheral surface of ball 50. Similarly, the wall of cavity 44 forms an arcuate concave surface 56 opposing surface 54 and substantially identical to the contour of the peripheral surface of ball 50. In the cross-sectional view of FIG. 3, it is seen that the wall of the bore 42 is rectangular and the wall of cavity 44 is substantially U-shaped.

In the installed position, the housing 24 is orientated such that the bottom edge of cavity 44 defines a horizontal axis or plane AA which corresponds to a horizontal setting for the vehicle. Consequently, the ball 50 is free to move within the cavity. FIG. 2 shows the cam shaft 36 in its applied position corresponding to the clutch pedal 12 being depressed. With the cam shaft 36 applied, the ball 50 is free to move between the plate 46 and a fixed position, tightly engaging the connecting member 26 and the wall of cavity 44 adjacent the cam shaft 36. The connecting member 26 is angularly disposed to the horizontal axis AA so that it approaches the horizontal axis from the plate 46 to the cam shaft 36. Therefore, when the vehicle and axis AA are inclined upwardly, the ball 50 will roll into engagement with both the connecting member 26 via surface 54 and the wall of cavity 44 via surface 56. If the brake pedal 10 is depressed at this time, the connecting member 26 is able to move leftwardly in FIG. 2, as the ball acts as a one way lock permitting movement leftwardly. When the brake pedal 10 is released and the ball 50 is engaged with the connecting member 26 and the cavity wall, the ball 50 will be moved slightly into tight engagement with the surfaces 54 and 56 to wedge the connecting member to the housing, thereby preventing the connecting member and brake pedal from returning to their rest positions and maintaining the brake pedal in its applied or depressed position. The vehicle will remain stationary on the incline to permit the vehicle operator to position one foot on the accelerator pedal 14 while the other foot is maintaining the clutch pedal 12 in its applied or depressed position.

In order to start the vehicle moving up the incline, the operator releases the clutch at the same time the accelerator pedal is depressed. Movement of the clutch pedal 12 away from the depressed position pivots the cam shaft 36 via link 34 so that an abutment 60 on the cam shaft 36 will engage the ball 50 to move the latter leftwardly, viewing FIG. 2, out of engagement with the connecting member 26. The connecting member 26 and the brake pedal 10 will move in order to return the brake pedal 10 to its rest position in response to the force of a return spring (not shown). As a result the vehicle brakes will be released substantially simultaneously with the reengagement of the clutch assembly and the transmission to start the vehicle moving up the incline.

So long as the clutch pedal 12 remains in its rest position, the cam shaft 36 will prevent the ball 50 from tightly engaging both surfaces 54 and 56 so that the connecting member 26 and brake pedal 10 will be free to return to their rest position after each brake application. Also, if the vehicle is disposed on a horizontal surface or facing downhill, the ball 50, which is sensitive to angular elevation, will not roll rightwardly in FIG. 2 to engage the connecting member 26. Therefore, in the absence of an incline, the vehicle brakes will automatically be released upon termination of braking.

Figure 6:
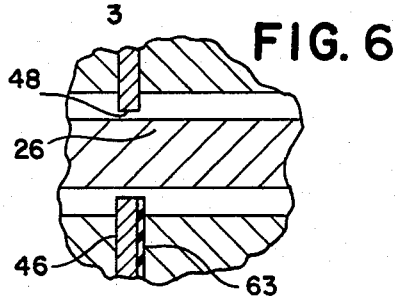
FIG. 6 is an enlarged partial view of an embodiment similar to FIG. 2.
Figure 4:
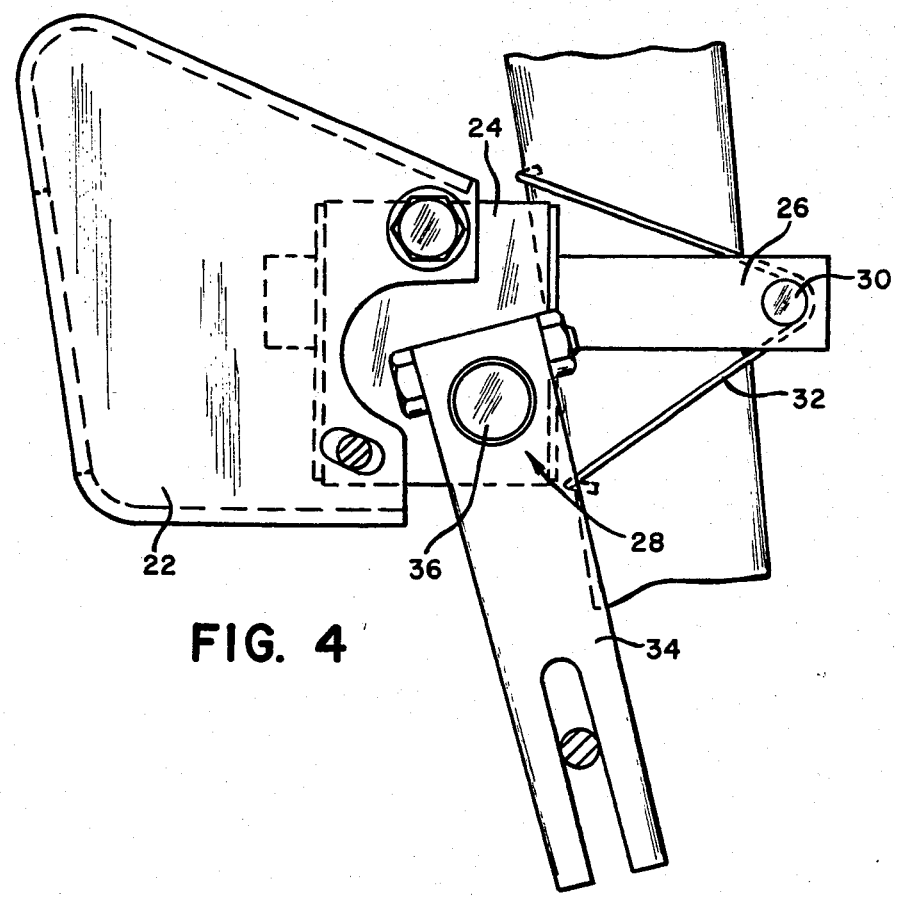
FIG. 4 is a side view of the control device in the absence of the brake pedal and the clutch pedal.
Figure 5:
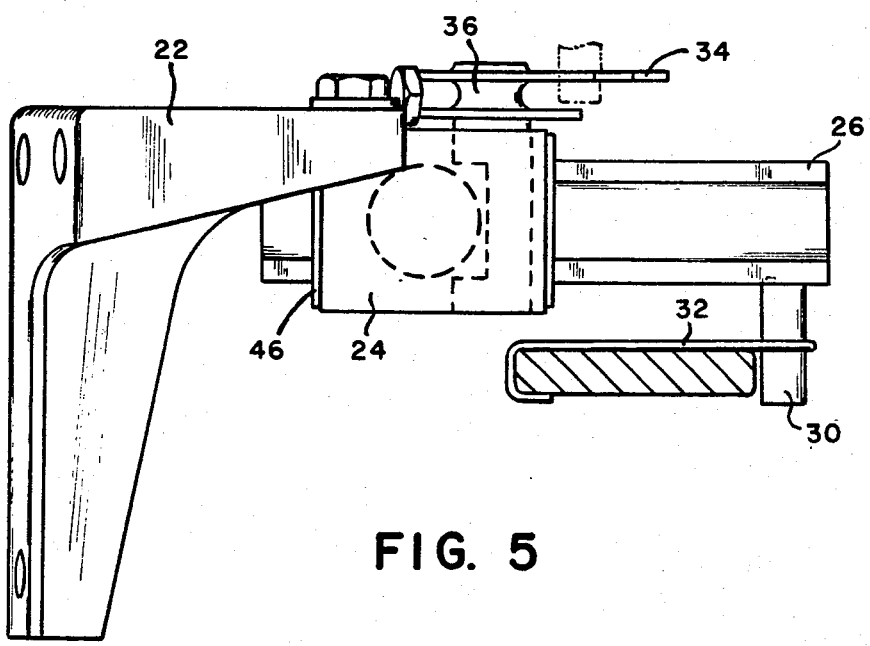
FIG. 5 is a bottom view of FIG. 4.

A further feature of the present invention provides a cushioned surface 63 (see FIG. 6) on the plate 46 to substantially prevent the ball 50 from bouncing relative to the plate 46 should the ball be impacted thereagainst during a panic stop. Also, plate 46 may be made of a suitable material in order to provide a cushioned surface 62 (see FIG. 2). In addition, it is contemplated that a fluid medium can be carried within the cavity 44 to dampen any oscillation movement of the ball 50 apart from being movable solely in response to an angular elevation for the vehicle.

I claim:

1. A mechanical brake control device for a vehicle including a brake pedal and a clutch pedal wherein the brake is movable to a brake applied mode during braking, the device comprising a housing adapted for attachment to the vehicle, a connecting member extending from the housing to the brake pedal for movement with the latter, locking means cooperating with the housing and the connecting member to selectively fix the connecting member and the brake pedal relative to the housing, and control means extending from the clutch pedal to the housing, the control means being operable in response to movement of the clutch pedal to render the locking means in an operative mode or an inoperative mode, characterized in that said housing compactly encloses said locking means and defines a guide upon which said locking means is disposed, said guide being normally disposed in a substantially horizontal plane when the vehicle is also disposed on a substantially horizontal surface, said locking means being movable independently into direct engagement with said connecting member solely in response to the vehicle and said guide being repositioned angularly relative to the horizontal plane, provided said control means maintains said locking means in an operative mode, and said locking means comprises a ball which frictionally engages said connecting member to fix the latter and said brake pedal in one direction relative to said housing in a brake applied mode.

2. The mechanical brake control device of claim 1, in which said guide cooperates with said connecting member to define a cavity therebetween for movably receiving said locking means and a pair of walls of said cavity form a wedge.

3. The mechanical brake control device of claim 1, in which said housing includes a plate with an opening receiving said connecting member and said plate opposes said locking means.

4. The mechanical brake control device of claim 3, in which said plate defines a cushion facing said locking means, said cushion being engageable with said locking means to reduce bouncing thereof away from said plate when said locking means is impacted against said plate.

5. The mechanical control device of claim 1, in which said connecting member and said guide form arcuate surfaces facing each other to substantially form a circular profile therebetween in order to receive said ball therebetween.

6. The mechanical control device of claim 1, in which said connecting member is attached to said brake pedal via releasable means which permits separation between said connecting member and said brake pedal in one direction in the event said connecting member fails to move in the one direction.

7. The mechanical control device of claim 6, in which said releasable means comprises a wire clip biasing said connecting member in the one direction into abutment with said brake pedal.

8. The mechanical brake control device of claim 1, wherein the control means includes a shaft having an abutment for engaging said ball.

9. A mechanical brake control device for a vehicle with a brake pedal and a clutch pedal, the brake pedal being movable from a rest position to an applied position during braking, the clutch pedal being movable from a rest position to an applied position when an associated clutch assembly is disengaged, the mechanical brake control device having a connection with the brake pedal and the clutch pedal for actuation thereby and including means responsive to an angular orientation of the vehicle to oppose movement of the brake pedal away from the applied position when the angular orientation is different from a substantially horizontal plane and the clutch pedal is in its applied position, characterized by said connection between said device and said brake pedal defining a first abutment maintaining said brake pedal in the applied position when said device is actuated and a second abutment normally actuating said device when said brake pedal is moved to the applied position and capable of severing said brake pedal from said device in the event said device fails to actuate properly in response to movement of said brake pedal to the applied position.

10. The mechanical brake control device of claim 9, in which said connection comprises a stop fixed to said brake pedal or said device and a resilient member extending between said stop and said device or said brake pedal, respectively.

11. The mechanical brake control device of claim 9, wherein the control device includes a shaft for engaging the responsive means.

12. The mechanical brake control device of claim 9, in which said brake control device includes a cushioned surface and said cushioned surface opposes the responsive means to gradually reduce movement of the responsive means away from said cushioned surface when the responsive means is impacted thereagainst.

13. A mechanical brake control device for a vehicle which includes a brake pedal and a clutch pedal, the device being compactly disposed substantially between said pedals and comprising, in combination, a housing with a bore therethrough, a connecting member movably disposed within said bore and operatively coupled to said brake pedal for movement therewith, a ball cooperating with said housing and said connecting member to selectively lock said connecting member to said housing, and a control assembly extending between said housing and said clutch pedal, said control assembly cooperating with said ball to maintain the latter in an inoperative position when said clutch pedal is in its rest position, said control assembly permitting said ball to move to an operative position when said clutch pedal is moved away from its rest position, and said ball being movable independently to an operative position solely in response to an angular elevation of the vehicle away from a horizontal setting, said ball directly engaging said connecting member and said housing in a wedging relation in the operative position to fix said connecting member in one direction relative to said housing when said brake pedal and said clutch pedal are moved away from their rest positions so that said brake pedal is retained in its applied position until said clutch pedal is returned to its rest position, thereby enabling a vehicle to remain stationary in the angular elevation without requiring the vehicle operator to hold said brake pedal in its applied position.

14. The mechanical brake control device of claim 13, in which said housing includes a plate with an opening for movably receiving said connecting member and said plate opposed said ball to retain the latter within said housing.

15. The mechanical brake control device of claim 13, in which said housing includes a cushioned surface and said cushioned surface opposes said ball to gradually reduce the rebound of said ball away from said cushioned surface when said ball is impacted thereagainst.

16. The mechanical brake control device of claim 15, in which said housing cushioned surface is provided on a plate for said housing and said plate retains said ball within said housing.

17. The mechanical brake control device of claim 13, in which said connecting member defines an arcuate surface and said housing defines an arcuate surface, both of said arcuate surfaces including a contour matching an outer surface for said ball and both of said arcuate surfaces approaching each other as they approach said control assembly.

18. The mechanical brake control device of claim 13, wherein the control assembly comprises a shaft for maintaining said ball in the inoperative position.

19. The mechanical brake control device of claim 18, wherein the shaft includes an abutment for engaging said ball.

20. A mechanical brake control device for a vehicle which includes a brake pedal and a clutch pedal, the device cooperating with the brake pedal and the clutch pedal in order to retain the brake pedal in an applied position when the vehicle is in an angular elevation and the clutch pedal is in an applied position so that the vehicle will remain stationary in the angular elevation in the absence of an application force applied to the brake pedal, said device comprising a housing with a bore therethrough, a connecting member extending from the brake pedal and through the bore, said housing including a cavity in common with said bore for movably receiving a ball therein, a control assembly extending from the clutch pedal into the cavity at one end thereof, said connecting member and the wall of said cavity defining surfaces which approach each other in the direction of said control member in the cavity, said ball being movable toward the one end in response to the angular elevation to tightly engage said connecting member and said housing at the one end and prevent movement of said connecting member in one direction, said control assembly being operable in response to operation of the clutch pedal to move said ball toward the other end of said cavity thereby freeing said connecting member for movement relative to said housing.

21. The mechanical brake control device of claim 20, in which said bore and said cavity lead to an opening in common therewith, said housing including a plate attached thereto closing the opening and said plate defining an opening for receiving said connecting member.

22. The mechanical brake control device of claim 20, in which the wall of said bore defines a rectangle in a cross-sectional plane normal to said connecting member and the wall of said cavity is substantially U-shaped in the cross-sectional plane normal to said connecting member.

23. The mechanical brake control device of claim 20, in which said connecting member defines an arcuate concave surface for receiving a portion of said ball.

24. The mechanical brake control device of claim 23, in which said housing defines an arcuate concave surface for receiving said ball and said surfaces cooperate with each other to uniformly spread forces generated between said connecting member and said housing, when said ball is tightly engaging said connecting member and said housing.

25. The mechanical brake control device of claim 20, wherein the control assembly comprises a shaft for moving said ball.

26. The mechanical brake control device of claim 25, wherein the shaft includes an abutment for displacing said ball.

27. The mechanical brake control device of claim 20, in which said housing includes a cushioned surface and said cushioned surface opposes said ball to gradually reduce the rebound of said ball away from said cushioned surface when said ball is impacted thereagainst.

28. A mechanical brake control device for a vehicle having a brake pedal and a clutch pedal, said device including a housing fixedly secured to said vehicle for compact disposition between said brake pedal and said clutch pedal, a connecting member extending outwardly from said housing to connect with said brake pedal for movement therewith, a ball or the like compactly enclosed within said housing, said ball being movable within said housing between a first position permitting free movement of said connecting member within said housing and a second position frictionally engaging said housing and said connecting member to fixedly secure said connecting member to said housing to prevent movement of said connecting member and said brake pedal in one direction, said ball being movable to said second position solely in response to said vehicle being disposed on an incline facing upwardly, and a control assembly extending from within said housing to said clutch pedal to cooperate with said ball inside said housing, said control assembly normally maintaining said ball in said first position even when said vehicle is disposed on said incline facing upwardly and said clutch pedal is in its rest position, said control assembly being responsive to said clutch pedal being moved away from its rest position to permit said ball to move to said second position and said clutch pedal returning to its rest position to actuate said control assembly to, in turn, return said ball to its first position.

29. The mechanical brake control device of claim 28, in which said housing defines a cavity with tapered walls and said ball cooperates with said tapered walls and said connecting member to form a wedge.

30. The mechanical brake control device of claim 28, in which said ball is the only part sensitive to the position of said vehicle on said incline facing upwardly and said ball is also the only part frictionally engaging said connecting member and said housing to prevent movement therebetween.

31. The mechanical brake control device of claim 28, in which the control assembly comprises a shaft for maintaining said ball in the first position.

32. The mechanical brake control device of claim 31, wherein the shaft includes an abutment for engaging said ball.

33. The mechanical brake control device of claim 28, in which said housing includes a cushioned surface and said cushioned surface opposes said ball to gradually reduce the rebound of said ball away from said cushioned surface when said ball is impacted thereagainst.

* * * * *